(12) United States Patent
Doll et al.

(10) Patent No.: US 9,132,872 B2
(45) Date of Patent: Sep. 15, 2015

(54) SYSTEM FOR ASSEMBLING A VEHICLE BODY

(71) Applicant: Honda Motor Co., Ltd., Tokyo (JP)

(72) Inventors: John Doll, Plain City, OH (US); Rhett Chapman, Germantown, OH (US); Zach Olding, Marysville, OH (US); Kevin Comerford, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 13/828,132

(22) Filed: Mar. 14, 2013

(65) Prior Publication Data

US 2014/0259614 A1 Sep. 18, 2014

(51) Int. Cl.
*B62D 65/18* (2006.01)
*B62D 65/02* (2006.01)
*B62D 25/06* (2006.01)

(52) U.S. Cl.
CPC .............. *B62D 65/022* (2013.01); *B62D 25/06* (2013.01); *B62D 65/026* (2013.01); *B62D 65/18* (2013.01); *Y10T 29/49622* (2015.01); *Y10T 29/49829* (2015.01); *Y10T 29/53365* (2015.01); *Y10T 29/53383* (2015.01); *Y10T 29/53409* (2015.01); *Y10T 29/53417* (2015.01); *Y10T 29/53548* (2015.01)

(58) Field of Classification Search
CPC ................... Y10T 29/49622; Y10T 29/53313; Y10T 29/5337; Y10T 29/53378; Y10T 29/53383; Y10T 29/534; Y10T 29/53409; Y10T 29/53417; Y10T 29/53539; Y10T 29/53593; Y10T 29/53548; Y10T 29/49829; Y10T 29/49828; B62D 65/022; B62D 65/02; B62D 65/024; B62D 65/026; B62D 65/04; B62D 65/18; B62D 65/06
See application file for complete search history.

(56) References Cited

U.S. PATENT DOCUMENTS

| 4,471,519 A | 9/1984 | Capello et al. |
| 4,667,866 A | 5/1987 | Tobita et al. |

(Continued)

FOREIGN PATENT DOCUMENTS

| JP | 57137231 | 8/1982 |
| JP | 2007196822 | 8/2007 |

(Continued)

OTHER PUBLICATIONS

International Search Report and Written Opinion of PCT/US2014/017305 dated Jun. 5, 2014, 13 pages.

*Primary Examiner* — Jason L Vaughan
(74) *Attorney, Agent, or Firm* — Rankin, Hill & Clark LLP

(57) ABSTRACT

A system for assembling a vehicle includes a first assembly line having a plurality of first stations, including a welding station for welding first structural components that define a vehicle body portion. The first structural components are formed of a first material. The second assembly line receives the vehicle body portion from the first assembly line and has a plurality of second stations, including a second welding station where a second structural component is secured to the first structural components. The second structural component is formed of the first material or a second material. The second assembly line is configured such that the second component is one of welded to the first components in the second welding station when the second component is formed of the first material and fastened to the first components in the second welding station when the second component is formed of the second material.

20 Claims, 17 Drawing Sheets

(56) References Cited

U.S. PATENT DOCUMENTS

| | | | |
|---|---|---|---|
| 4,738,387 A * | 4/1988 | Jaufmann et al. | 228/4.1 |
| 4,793,055 A * | 12/1988 | Shintani | 29/786 |
| 4,893,398 A | 1/1990 | Zimmer | |
| 4,928,383 A * | 5/1990 | Kaczmarek et al. | 29/711 |
| 5,143,270 A | 9/1992 | Hamada et al. | |
| 5,152,050 A * | 10/1992 | Kaczmarek et al. | 29/711 |
| 5,184,766 A | 2/1993 | Takahashi et al. | |
| 5,319,840 A | 6/1994 | Yamamoto et al. | |
| 5,400,944 A * | 3/1995 | Zimmer et al. | 228/49.6 |
| 5,427,300 A | 6/1995 | Quagline | |
| 6,336,582 B1 * | 1/2002 | Kato et al. | 228/102 |
| 6,493,930 B1 | 12/2002 | Raami | |
| 6,612,011 B2 * | 9/2003 | Mayr et al. | 29/430 |
| 6,687,971 B2 * | 2/2004 | Nakamura | 29/430 |
| 8,047,419 B2 * | 11/2011 | Sata et al. | 228/43 |
| 8,409,725 B2 * | 4/2013 | Hashimura et al. | 428/653 |
| 8,424,961 B2 * | 4/2013 | Carsley et al. | 296/210 |
| 8,636,197 B1 * | 1/2014 | Hill et al. | 228/175 |
| 8,950,647 B2 * | 2/2015 | Magnano et al. | 228/43 |
| 2002/0014008 A1 | 2/2002 | Sato et al. | |
| 2002/0100159 A1 * | 8/2002 | Swartz et al. | 29/430 |
| 2003/0159264 A1 * | 8/2003 | McLeod et al. | 29/428 |
| 2007/0092360 A1 * | 4/2007 | Joo | 414/373 |

FOREIGN PATENT DOCUMENTS

| | | |
|---|---|---|
| JP | 2009107549 | 5/2009 |
| JP | 2010047181 | 3/2010 |
| JP | 2010241319 | 10/2010 |
| JP | 2011147865 | 8/2011 |

\* cited by examiner

SYSTEM FOR ASSEMBLING A VEHICLE BODY

BACKGROUND

In the manufacture or assembly of a vehicle body, it is known to have a body assembly line including a plurality of stations in which the vehicle body is assembled and forwarded as the assembly work proceeds. Typically, the major components of the vehicle body are formed of low carbon steel or steel-based alloy panels that are welded together in the general welder (i.e., a station wherein primary welding operations are performed to connect the vehicle body components to create the body-in-white body).

The substitution of aluminum or aluminum-based alloy roof panels for the low-carbon steel or steel alloy roof panels most commonly used in motor vehicles is an attractive option for vehicle mass reduction. Often, however, the remainder of the vehicle body structure continues to be fabricated of steel. Joining an aluminum roof panel to a steel body panel presents difficulties because the aluminum roof component cannot be set and joined in the existing general welder due to equipment and process constraints. Therefore, it is known for manufacturers to secure the aluminum roof panel to the steel body panel after the weld process in assembly. This process typically includes an adhesive bonding operation and fasteners can also be used to secure the aluminum roof panel to the steel body panel. However, existing vehicle body assembly lines are not adapted for assembly of both steel roof panels and aluminum roof panels to the vehicle body.

BRIEF DESCRIPTION

In accordance with one aspect, a system for assembling a vehicle comprises a first assembly line and a second assembly line separate from the first assembly line. The first assembly line has a plurality of first stations including at least one first welding station for welding first structural components that define a portion of a vehicle body. The first structural components are formed of a first material. The second assembly line receives the portion of the vehicle body from the first assembly line. The second assembly line has a plurality of second stations including at least one second welding station. The second assembly line is adapted to secure a second structural component to the first structural components. The second structural component is formed of one of the first material and a second material. The second assembly line is configured such that the second component is one of welded to the first components in the second welding station when the second component is formed of the first material and fastened to the first components in the second welding station when the second component is formed of the second material.

In accordance with another aspect, a system for assembling a vehicle body comprises a first assembly line, a second assembly line and a third assembly line. The first assembly line has a plurality of first stations, including at least one first welding station configured to assemble first structural components that define a body component of a vehicle body. The body component is formed of a steel or steel-based alloy. The second assembly line is separate from the first assembly line and receives the body component from the first assembly line. The second assembly line has a plurality of second stations, including at least one second welding station. The second assembly line is adapted to secure a roof component to the body component. The roof component is formed of one of a steel or steel-based alloy and an aluminum or aluminum-based alloy. The second assembly line is configured such that the roof component is one of welded to the body component in the second welding station when the roof component is formed of a steel or steel-based alloy and fastened to the body component in the second welding station when the roof component is formed of an aluminum or aluminum-based alloy. The third assembly line is separate from the first and second assembly lines and is configured to set the roof component on a roof component jig and transfer the roof component jig, together with the roof component mounted thereon, to the second welding station of the second assembly line for attaching the roof component to the body component.

In accordance with yet another aspect, a method of assembling a vehicle body comprises assembling a body component formed of steel or a steel-based alloy in a first assembly line; transferring the body component to a separate second assembly line for securing a roof component to the body component; positioning the roof component on a roof component jig; positioning the body component on a body component fixture; transferring the roof component jig having the roof component mounted thereon to a welding station of the second assembly line; setting the roof component jig in position relative to the body component fixture in the welding station; one of installing a plurality of bolts between the body component and roof component in the welding station and tightening the plurality of bolts when the roof component is formed of aluminum or an aluminum-based alloy or welding the roof component to the body component when the roof component is formed of a steel or steel-based alloy; transferring the body component with the roof component mounted thereon to a second welding station of the second assembly line; and further tightening the plurality of bolts when the roof component is formed of aluminum or an aluminum-based alloy or finish welding the roof component to the body component when the roof component is formed of a steel or steel-based alloy.

DETAILED DESCRIPTION

It should, of course, be understood that the description and drawings herein are merely illustrative and that various modifications and changes can be made in the structures disclosed without departing from the present disclosure. It will be appreciated that the various identified components of the exemplary system for assembling a vehicle body disclosed herein are merely terms of art that may vary from one manufacturer to another and should not be deemed to limit the present disclosure. As used herein, lateral directions are transverse across the vehicle body, i.e., left and right directions. Likewise, longitudinal directions refer to forward and rearward directions of the vehicle body, and the vertical directions relate to elevation, i.e., upward and downward directions.

Figure 1:
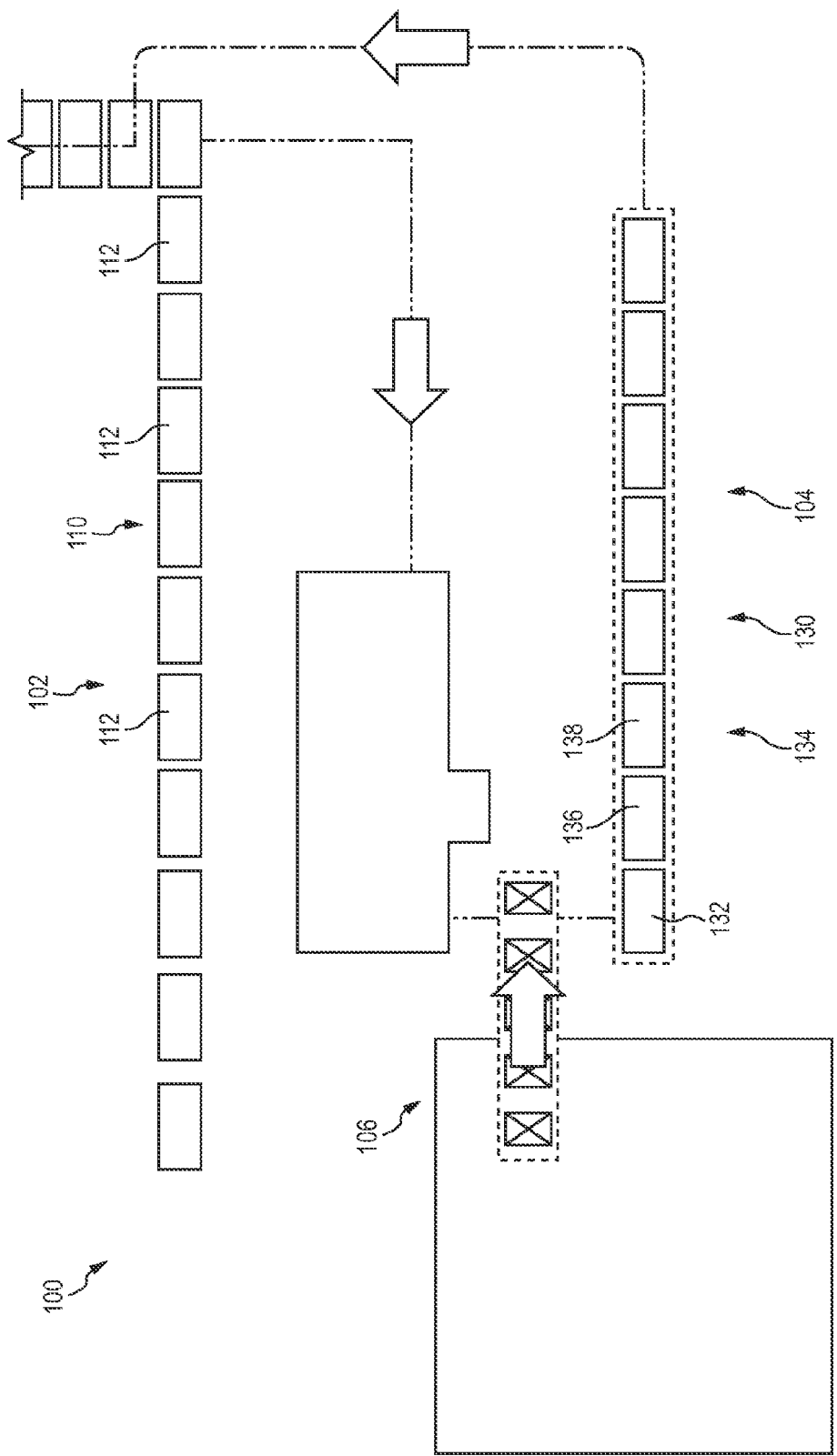
FIG. 1 is a schematic view of a system for assembling a vehicle body, including a first assembly line, a second assembly line separate from the first assembly line, and a third assembly line separate from the first and second assembly lines.

Referring now to the drawings, wherein like numerals refer to like parts throughout the several views, FIG. 1 schematically illustrates a system 100 for assembling a vehicle body, according to the present disclosure. The system 100 generally includes a first assembly line 102, a second assembly line 104 separate from the first assembly line, and a third assembly line 106 separate from each of the first and second assembly lines 102, 104. The first assembly line has a plurality of first stations 110, including at least one first welding station 112 for welding first structural components that define a portion 120 of a vehicle body 122 (see FIG. 2). The at least one welding station can be a plurality of welding stations 112 in the first assembly line 102. The first structural components of the vehicle body portion 120 are body component, for example, left and right side panels, that are welded to a vehicle frame. The first structural components are formed of a first material such as a steel or steel-based alloy.

Figure 2:
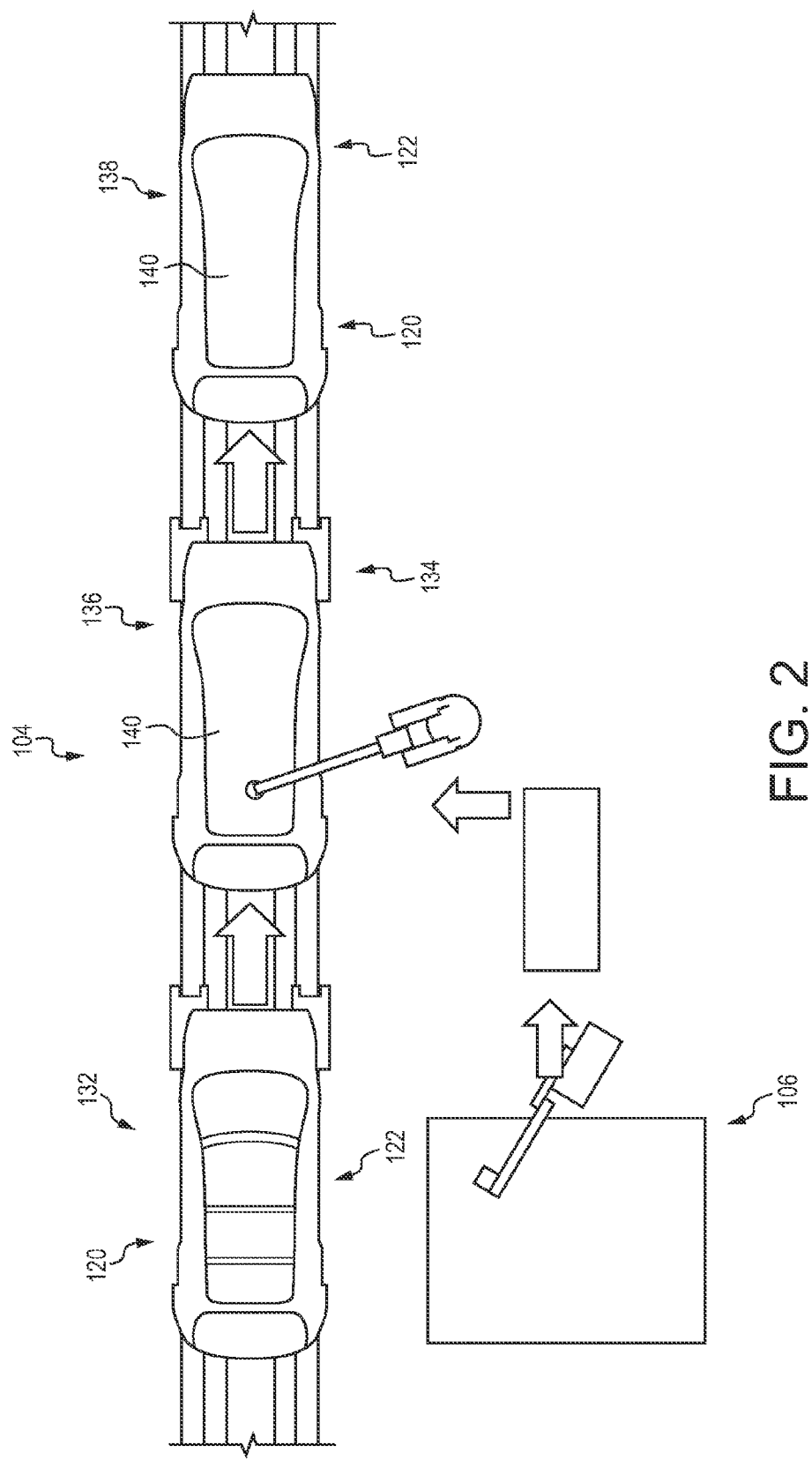
FIG. 2 is a schematic view of three stations of the second assembly line, a leftmost body station for receiving an assembled portion of the vehicle body from the first assembly line, and a pair of welding stations.

The second assembly line 104 is separate from the first assembly line 102 and receives the assembled portion 120 of the vehicle body 122 from the first assembly line. The second assembly line has a plurality of second stations 130. As shown in FIG. 2, the plurality of second stations can include a body station 132 for receiving the vehicle body portion 120 and at least one second welding station 134. The at least one second welding station 134 can include welding station 136 located immediately downstream of the body station 132 and secondary welding station 138 located immediately downstream of the welding station 136. As will be discussed in greater detail below, the second assembly line 104 is adapted to secure a second structural component (i.e. a roof component 140) to the first structural components (i.e., body components 120) that define the vehicle body 122. The second structural component 140 can be formed of one of the first material similar to the first structural components and a second material, which can be an aluminum or aluminum-based alloy.

Figure 3:
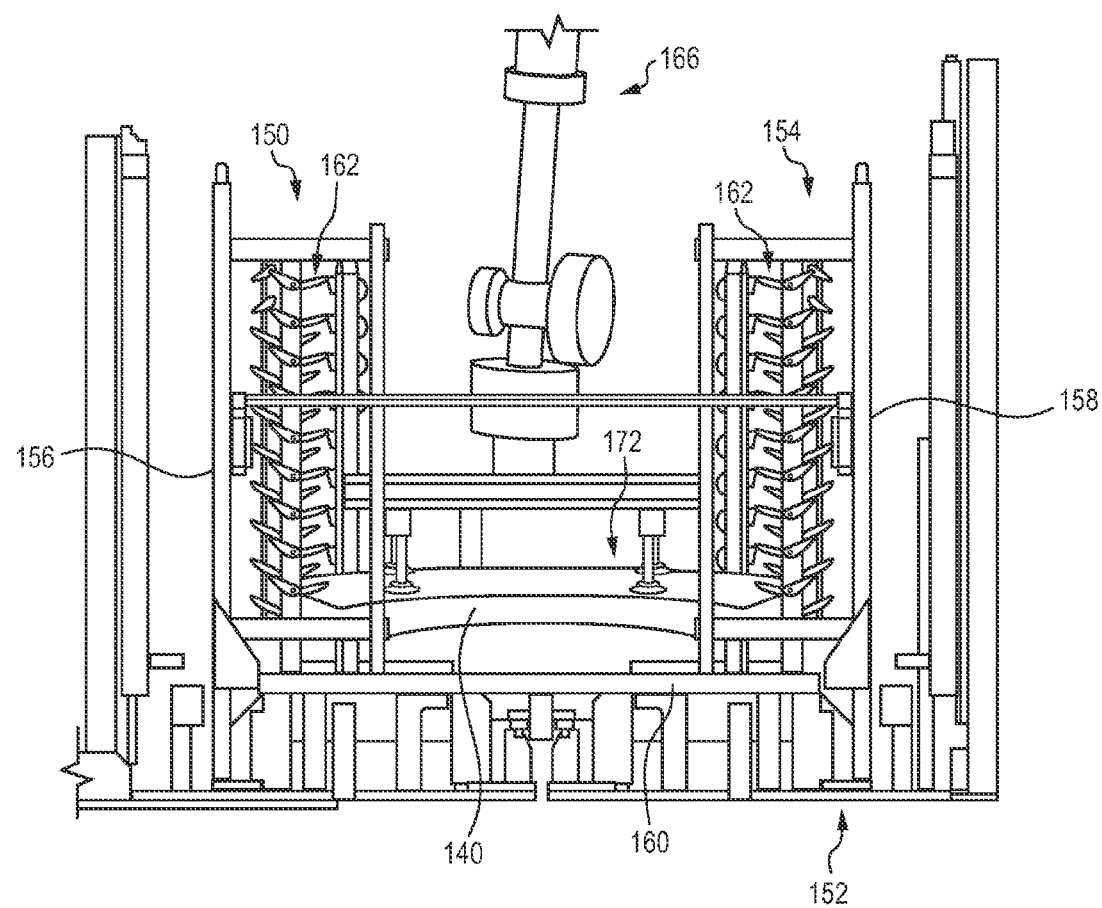
FIG. 3 is a view of a first robot-guided handling device configured to transport a roof component from a cart provided in the third assembly line.
Figure 4:
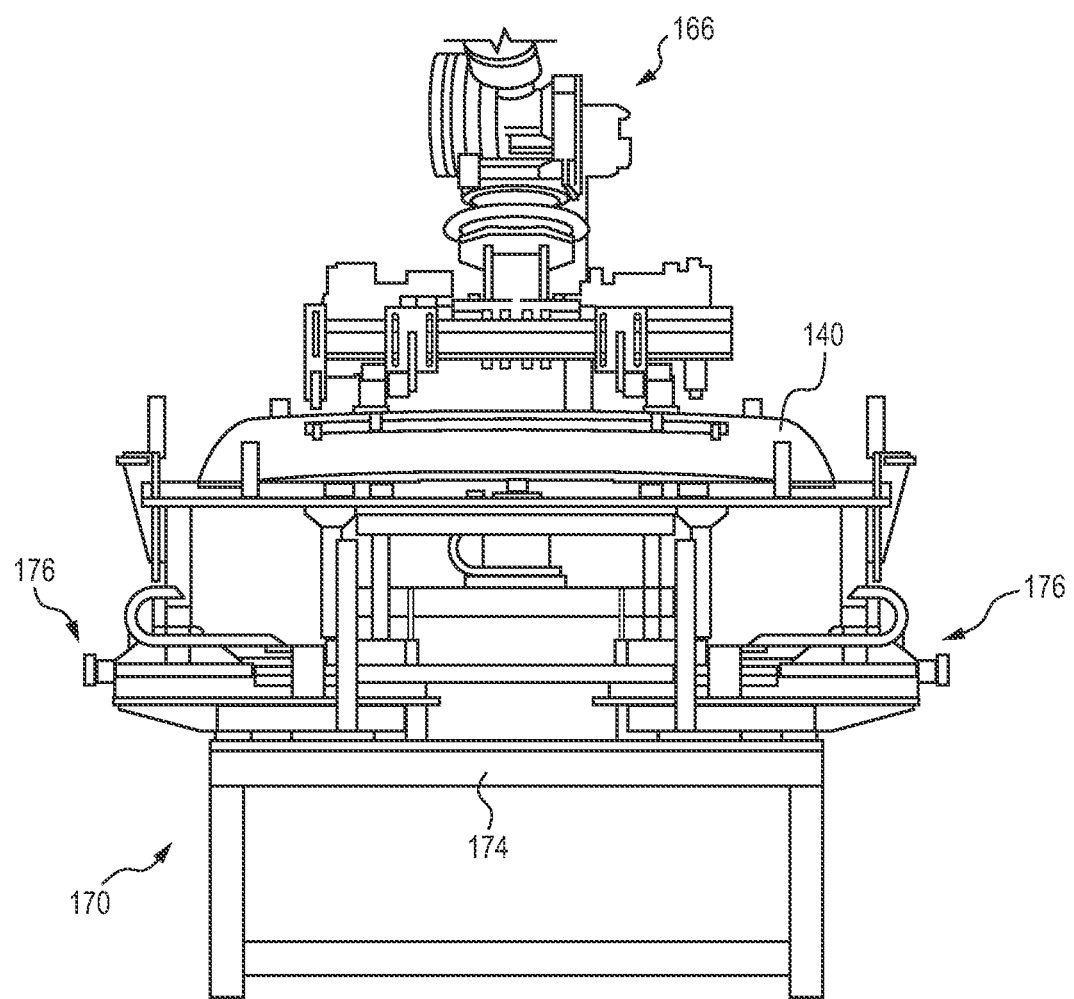
FIG. 4 is a view of the first robot-guided handling device of FIG. 3 setting the roof component on a roof component fixture provided in the third assembly line.

The third assembly line 106 is configured to transfer the second component or roof component 140 to the second welding station 136 of the second assembly line 104 for attaching the roof component 140 to the body component 120. With reference now to FIG. 3, the roof component 140 can be auto-loaded into a cart 150 and the cart together with the roof component 140 is transported to a cart lock station 152 located in the third assembly line 106. As shown, the cart 150 is provided with a frame structure 154 having a pair of spaced uprights 156, 158 interconnected by a base member 160. Provided on each of the uprights 156, 158 is a mechanism 162 which supports the roof component 140 in the cart 150. The cart lock station 152 is configured to locate the cart 150 to a fixed position for transport. Once the cart 150 is properly set in the cart lock station 152, a first robot-guided handling device 166 is configured to transport the roof component 140 from the cart 150 to a roof component fixture 170 (FIG. 4). The first robot-guided handling device 166 can be provided with a suction mechanism 172 which allows the first robot-guided handling device 166 to releasably engage the roof component 140 and remove the roof component from the cart 150.

Figure 5:
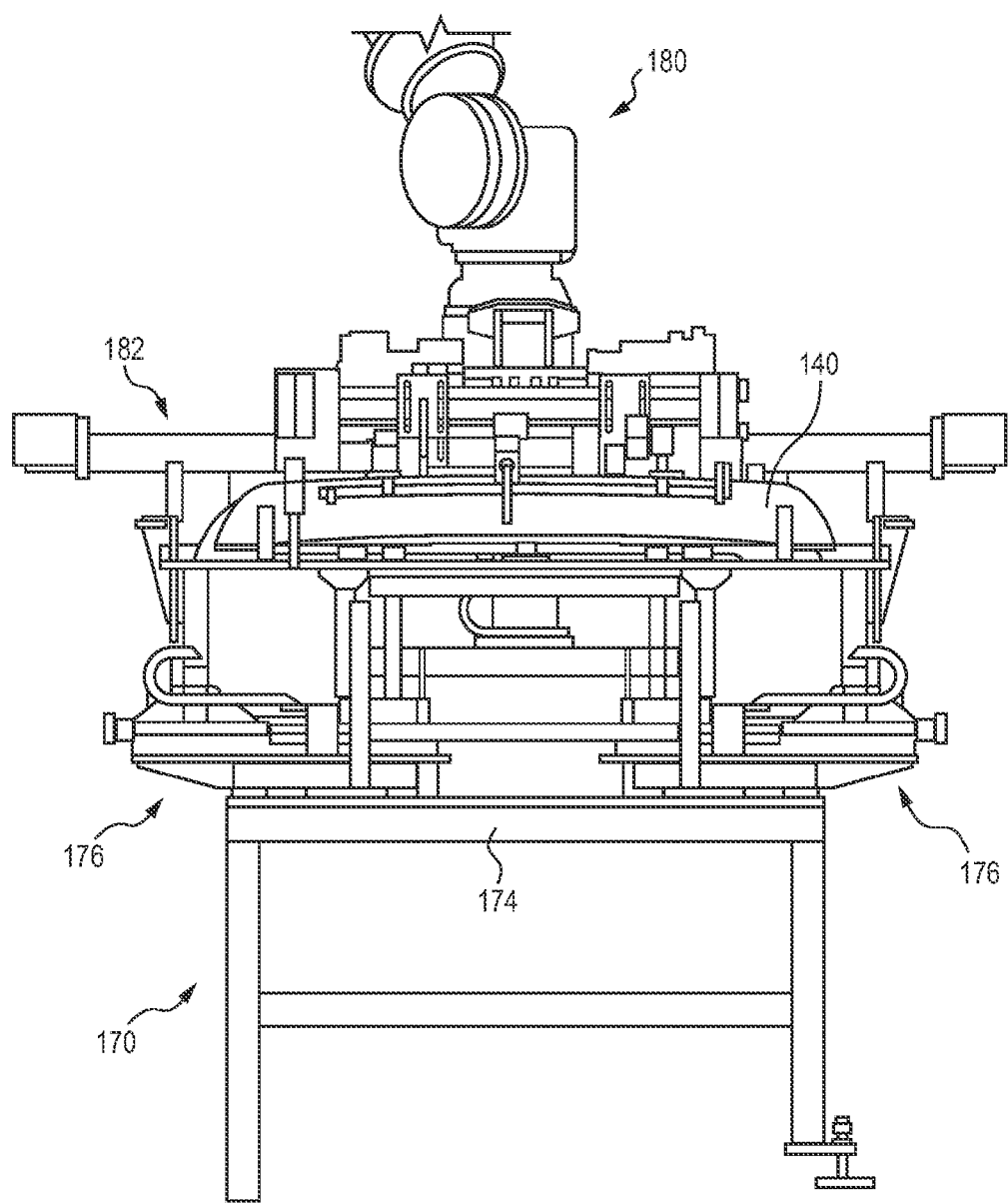
FIG. 5 is a view of a second robot-guided handling device including a roof component jig configured to have mounted thereto the roof component.

FIG. 4 depicts the roof component 140 auto-loaded onto the roof component fixture 170 via the first robot-guided handling device 166. As depicted, the roof component fixture 170 includes a base 174 having mounted thereon a pair of first alignment mechanisms 176. Each first alignment mechanism 176 is configured to locate and align the roof component 140 both laterally and longitudinally on the roof component fixture 170. More particularly, the first robot-guided handling device 166 positions the roof component 140 generally flat on the roof component fixture 170. One of the first alignment mechanisms 176 will first advance a lateral pusher to position the roof component 140 laterally on the roof component fixture 170. One of the first alignment mechanisms 176 will next advance at least one longitudinal pusher to longitudinally align the roof component 140 on the roof component fixture 170. Once properly aligned on the roof component fixture 170, and as illustrated in FIG. 5, a second robot-guided handling device 180 is configured to move the roof component 140 to the welding station 136 of the second assembly line 104.

Figure 6A:
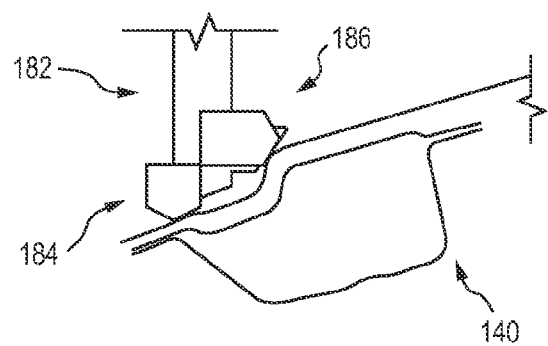
FIGS. 6A-6C depicts an alignment mechanism operably associated with the second robot-guided handling device of FIG. 5 for moving and aligning the roof component on the roof component jig.
Figure 6B:
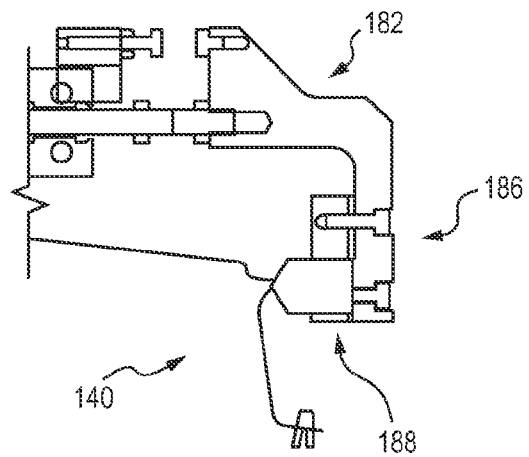
Figure 6C:
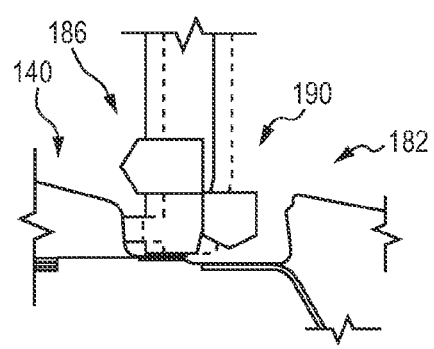

The second robot-guided handling device 180 is equipped with at least one roof component jig 182 configured to have mounted thereto the roof component 140 and a second alignment mechanism 184 configured to move and align the roof component 140 on the at least one roof component jig 182. The second alignment mechanism 184 includes a first pusher for moving the roof component 140 in a first direction on the roof component jig 182 and a second pusher for moving the roof component 140 in a second direction, which is transverse to the first direction, on the roof component jig 182. More particularly, FIGS. 6A-6C depict pushers of the second alignment mechanism 184 for aligning the roof component 140 on the roof component jig 182. FIG. 6A shows a pusher 186 of the second alignment mechanism 184 which can engage and position front flange of the roof component 140 on the roof component jig 182. FIG. 6B depicts a pusher 188 of the second alignment mechanism 184 which can engage and position a rear flange of the roof component 140 on the roof component jig 182. FIG. 6C depicts a pusher 190 of the second alignment mechanism 184 which can advance to set the lateral position of the roof component 140 on the roof component jig 182. After the roof component 140 is properly positioned on the roof component jig 182, the second robot-guided handling device 180 transfers the roof component 140 from the roof component fixture 170 to the welding station 136 of the second assembly line 104.

Figure 7:
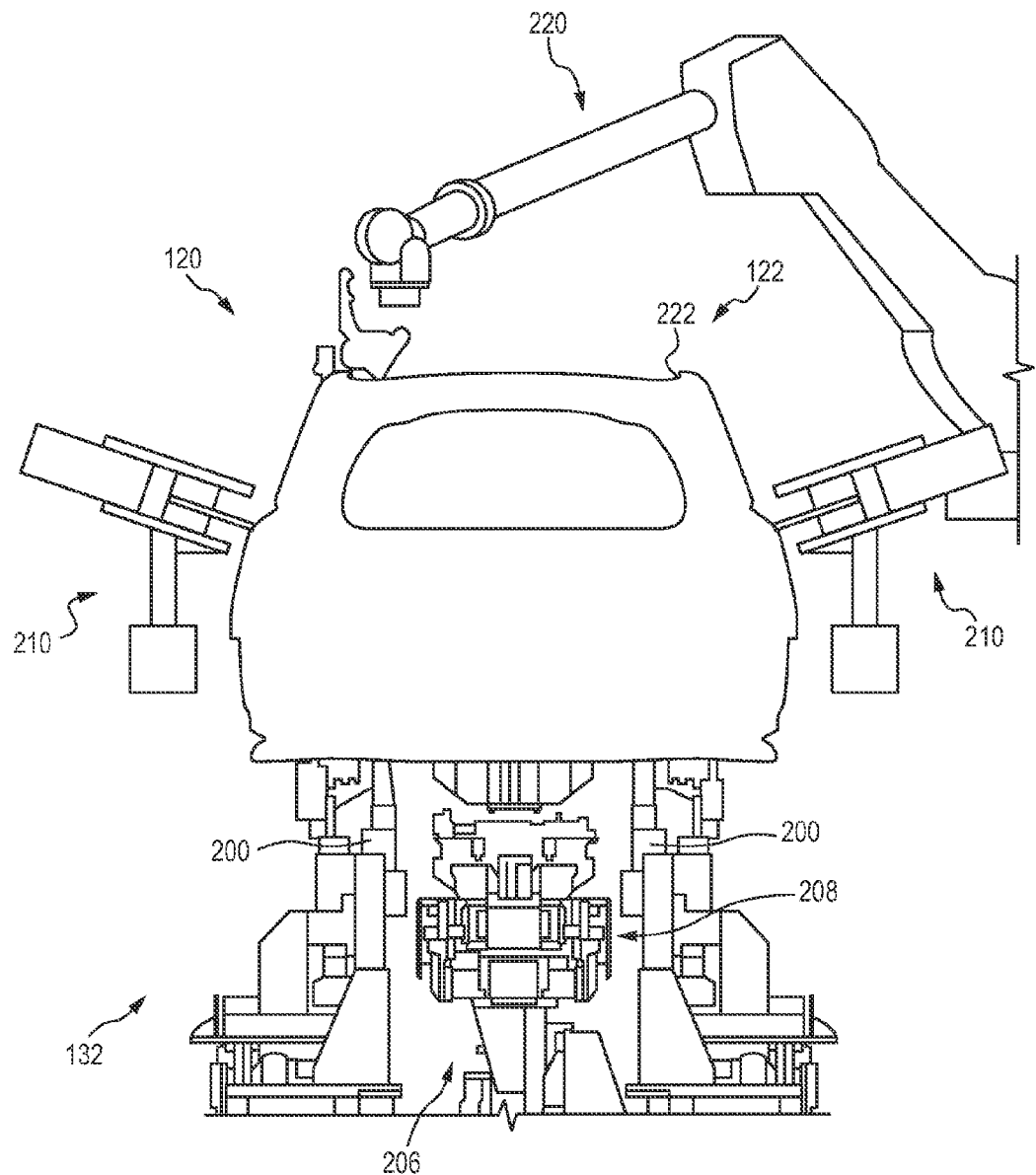
FIG. 7 is a view of the leftmost body station of FIG. 2 with the vehicle body portion.
Figure 8A:
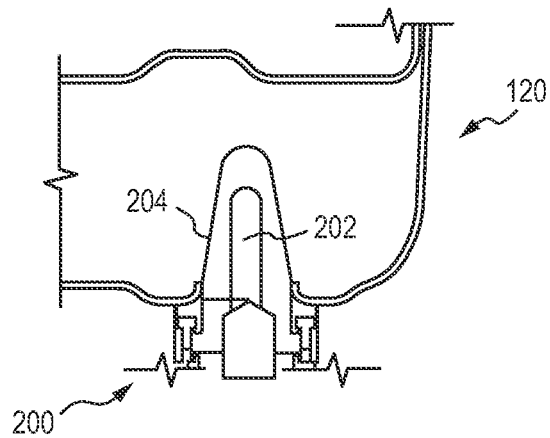
FIGS. 8A and 8B depict an alignment mechanism configured to move and align the vehicle body portion in the body station of FIG. 7.
Figure 8B:
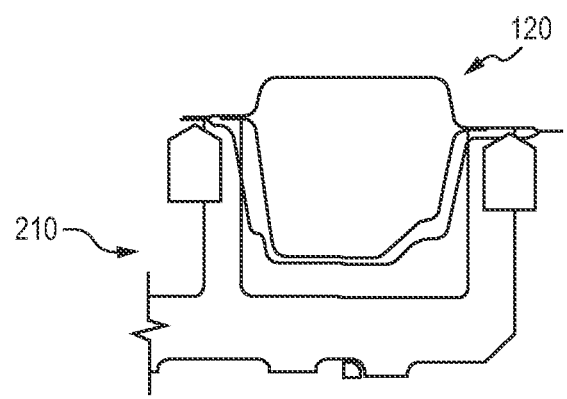

With reference now to FIG. 7, as indicated previously, the vehicle body portion 120 assembled in the first assembly line 102 (i.e., the first structural components) is transferred to the body station 132 of the second assembly line 104 via a transfer mechanism 206. The transfer mechanism 206 positions the vehicle body over a body fixture 200 provided in the body station 132 for receiving the vehicle body portion 120. It should be appreciated that the body component 120 can be set to the body fixture 200 simultaneously with movement of the roof component 140 to the roof component jig 182. To properly locate the vehicle body portion 120 on the body fixture 200, the body fixture 200 is provided with an alignment mechanism including a plurality of locating pins 202 which can be received in corresponding recesses 204 located on the vehicle body portion 120 (FIG. 8A). Once the pins are aligned with the recesses 204, a lift assembly 208 associated with the transfer mechanism 206 drops the vehicle body portion 120 downwardly on top of the pins 202. The pins 202 now positioned in the recesses 204 are configured to clamp to the vehicle body portion 204. A pair of pushers 210 are provided in the body station 132 which can advance toward the vehicle body portion 120 and laterally align the vehicle body portion on the body fixture 200 (FIG. 8B). Further provided in the body station 132 is a robot 220 configured to apply one of a seal to a roof opening 222 of the vehicle body 122 when the roof component 140 is formed of the first material and an adhesive to the roof opening 222 when the roof component 140 is formed of the second material. After the application of the seal/adhesive to the roof opening 222, the lift mechanism 208 lifts the vehicle body portion 120 off of the locating pins 202 and the transfer mechanism 206 transfers the vehicle body portion 120 to the welding station 136.

Figure 9:
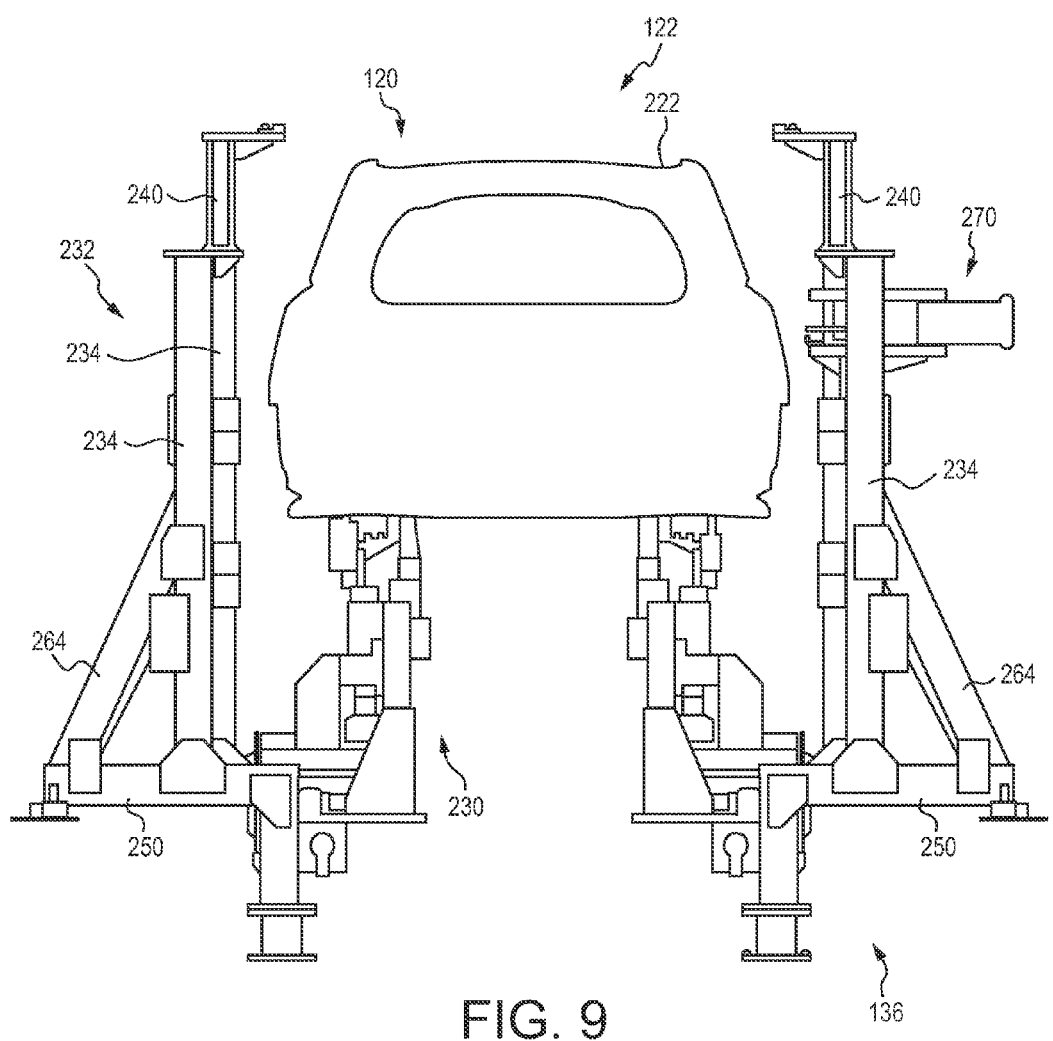
FIG. 9 is a view of the vehicle body portion positioned in the center welding station of FIG. 2.
Figure 15:
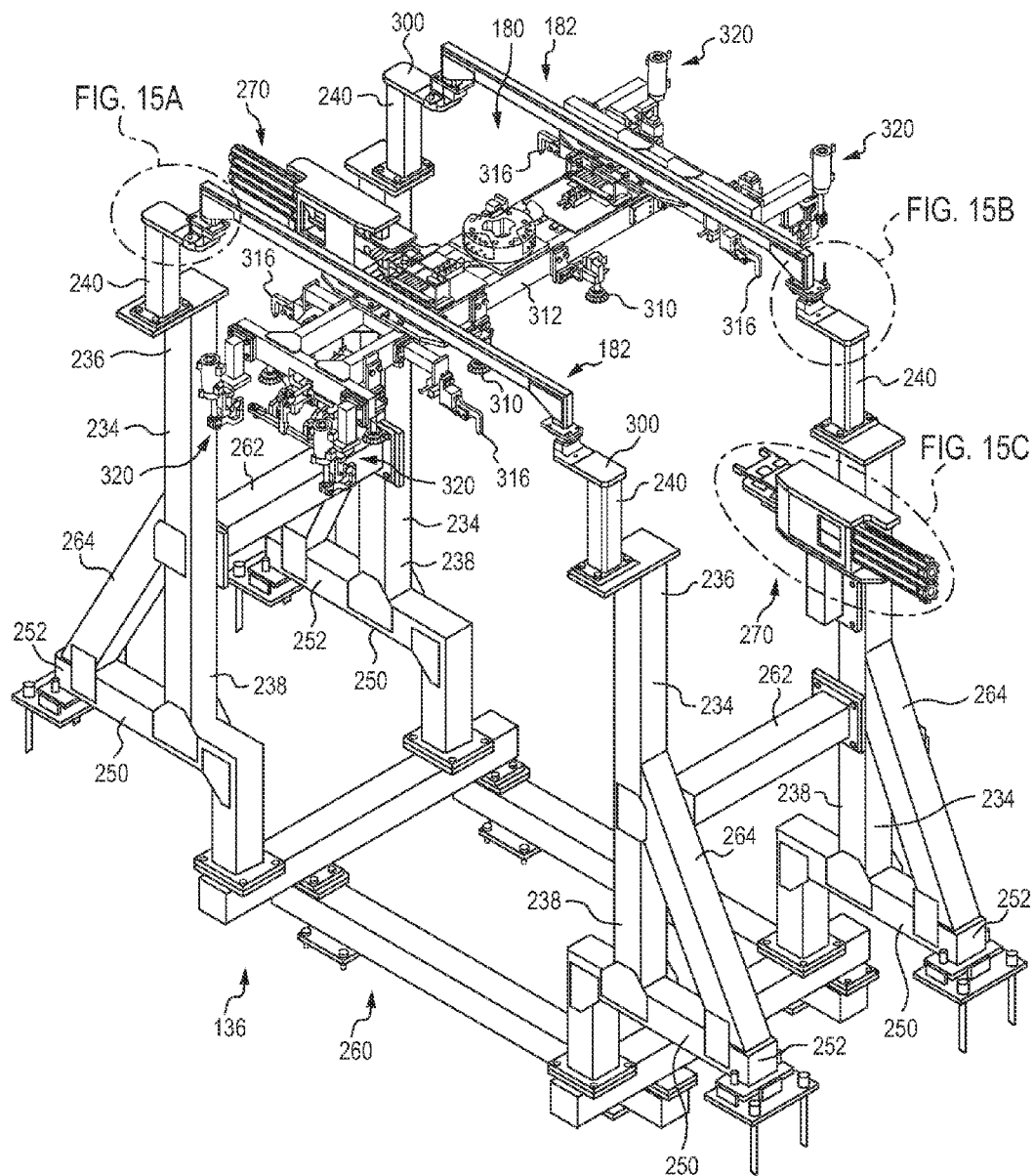
FIG. 15 is a perspective view of the portion of the second robot-guided handling device together with the roof component jigs of FIG. 12 mounted on the fixture of FIG. 10.

FIG. 9 depicts the vehicle body portion 120 secured on a body fixture 230 located in the welding station 136. Similar to the body fixture 200 provided at the body station 132, the body fixture 230 includes locating pins (not shown) which are received in the recesses 204 provided on the vehicle body portion 120. A pair of pushers (not shown, similar to pushers 210) can advance toward the vehicle body portion 120 and laterally align the vehicle body portion on the body fixture 230. A second fixture 232 is provided in the welding station 136 and flanks the vehicle body portion 120. As best illustrated in FIG. 15, the second fixture 232 is formed of a plurality of frame members, including spaced vertical frame members 234 having upper end portions 236 and lower end portions 238. Each upper end portion 236 of the vertical frame members 234 includes a vertical support member 240. The lower end portion 238 of each vertical frame member 234 is connected to an L-shaped frame member 250. Each L-shaped member 250 has one end portion 252 mounted to a support surface and the other end portion 254 mounted to a base frame assembly 260. Transverse frame members 262 interconnect the longitudinally spaced vertical support members 240 and angled frame members 264 interconnect the vertical support members 240 and the end portions 252 of the L-shaped frame members 250.

As indicated previously, the vehicle body portion 120 is transferred from the body station 132 to the welding station 136 and is set to the body fixture 230. A pusher 270 (FIG. 15C) is mounted to one of the vertical frame members 234 of the second fixture 232 and is configured to laterally align the vehicle body portion 120 within the second fixture 232. The pusher 270 can include a geared drive mechanism 272 at least partially housed in a housing 274 for moving engagement members or clamps 276 adapted to engage and move the vehicle body portion 120.

Figure 10:
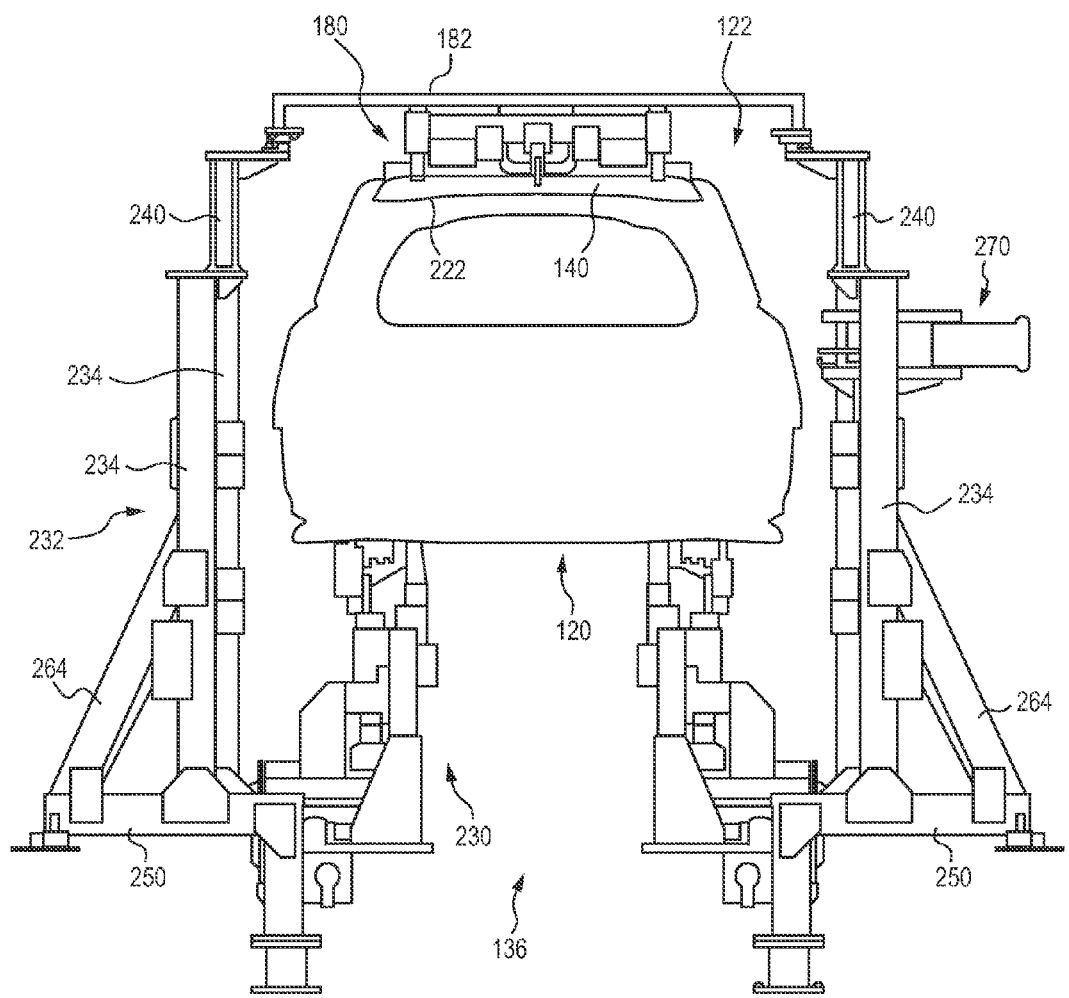
FIG. 10 is a view of the roof component jig of FIG. 5 mounted to a fixture of the welding station of FIG. 9.
Figure 11A:
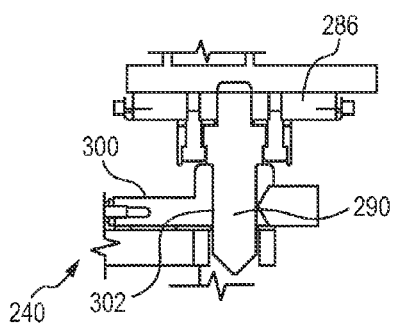
FIGS. 11A-11E depict the mounting and alignment of the roof component jig on the fixture of FIG. 10.
Figure 11D:
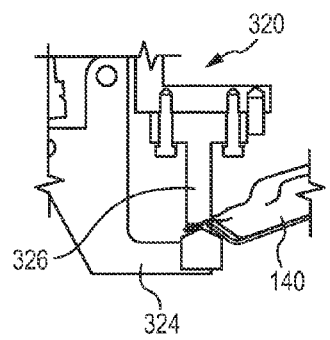
Figure 11B:
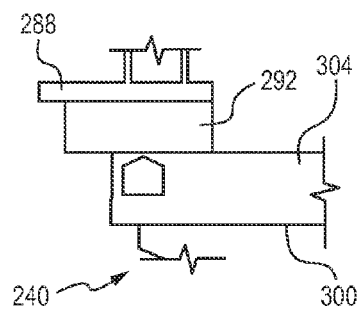
Figure 15A:
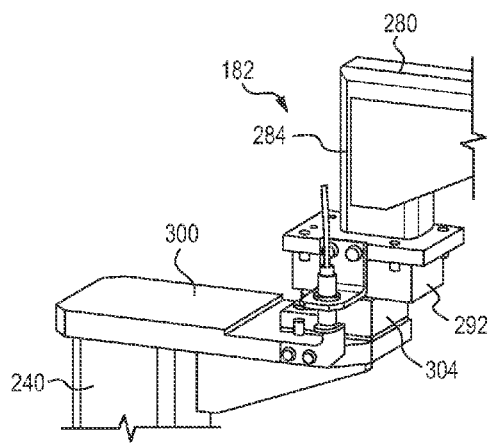
FIGS. 15A-15C depict the mounting and alignment of the roof component jigs to the fixture of FIG. 15.
Figure 15B:
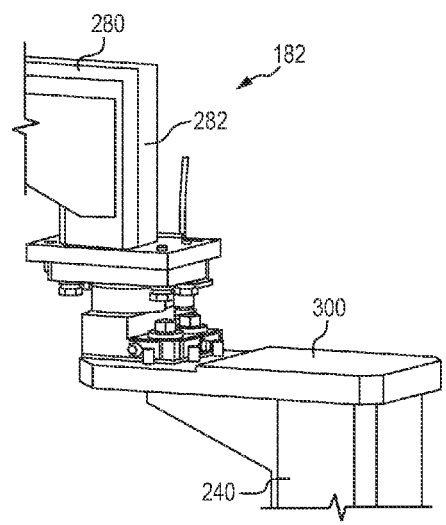
Figure 15C:
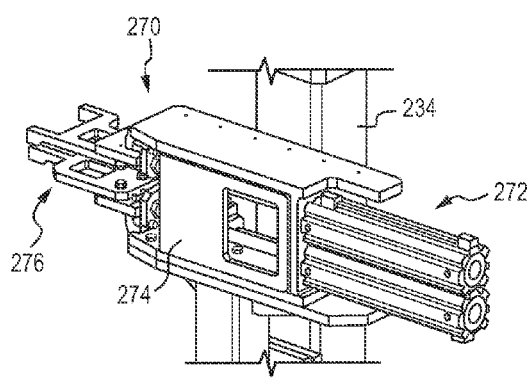

With reference now to FIG. 10, the second robot-guided handling device 180 is configured to move the roof component jig 182 together with the roof component 140 aligned thereon to the welding station 136 of the second assembly line 104 and set the roof component jig 182 in position relative to the second fixture 232. The vertical support members 240 of the second fixture 232 are adapted to have releasably mounted thereon the roof component jig 182. According to one aspect, the roof component jig 182 is releasably connected to the vertical support members 240 by at least one locating pin extending from the roof component jig 182 and being received in at least one opening provided on at least one of the vertical support members 240. Particularly, and with reference to FIG. 12, the second robot-guided handling device 180 is provided with a pair of spaced roof component jigs 182. Each roof component jig includes an elongated bar 280 having a first end portion 282 and a second end portion 284. A first mounting plate 286 is secured to the first end portion 282 and a second mounting plate 288 is secured to the second end portion 284. A locating pin 290 is secured to and projects downwardly from each first mounting plate 286. A spacer member 292 is secured beneath each second mounting plate 288. As shown in FIGS. 11A and 11B, each of the vertical support member 240 mounted to the vertical frame members 234 includes an extension 300. The extensions 300 are engaged by the first and second end portions 282, 284 of the bars 280 of the roof component jigs 182 (FIGS. 15A and 15B). More particularly, the extensions 300 engaged by the first end portions 282 are provided with openings 302 extending therethrough. The openings 302 are dimensioned to receive the locating pins 290 (FIG. 11A). The extensions 300 engaged by the second end portions 284 are provided with spacer member 304 which engages the spacer members 292 provided on the roof component jig 182 (FIG. 11B).

Figure 12:
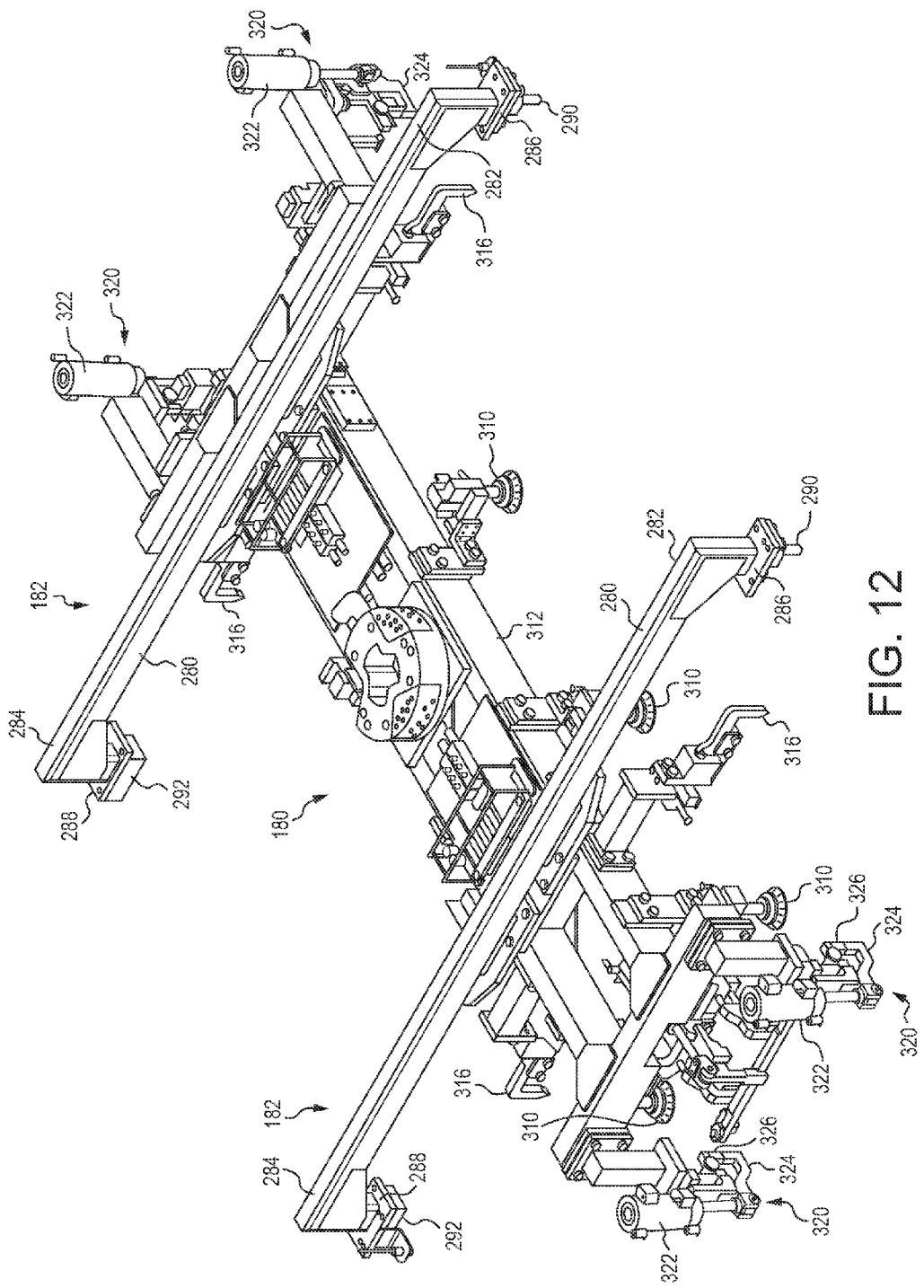
FIG. 12 is a perspective view of a portion of the second robot-guided handling device of FIG. 5 together with a pair of roof component jigs.
Figure 13:
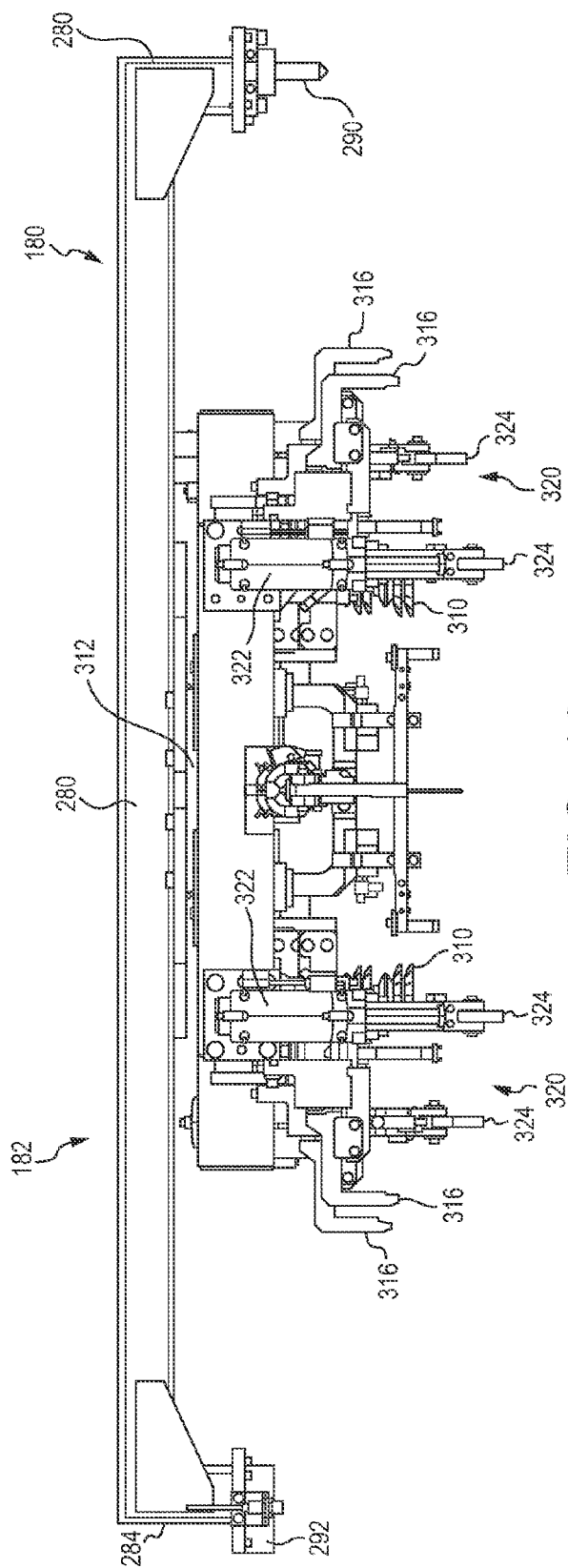
FIG. 13 is a front view of FIG. 12.
Figure 14:
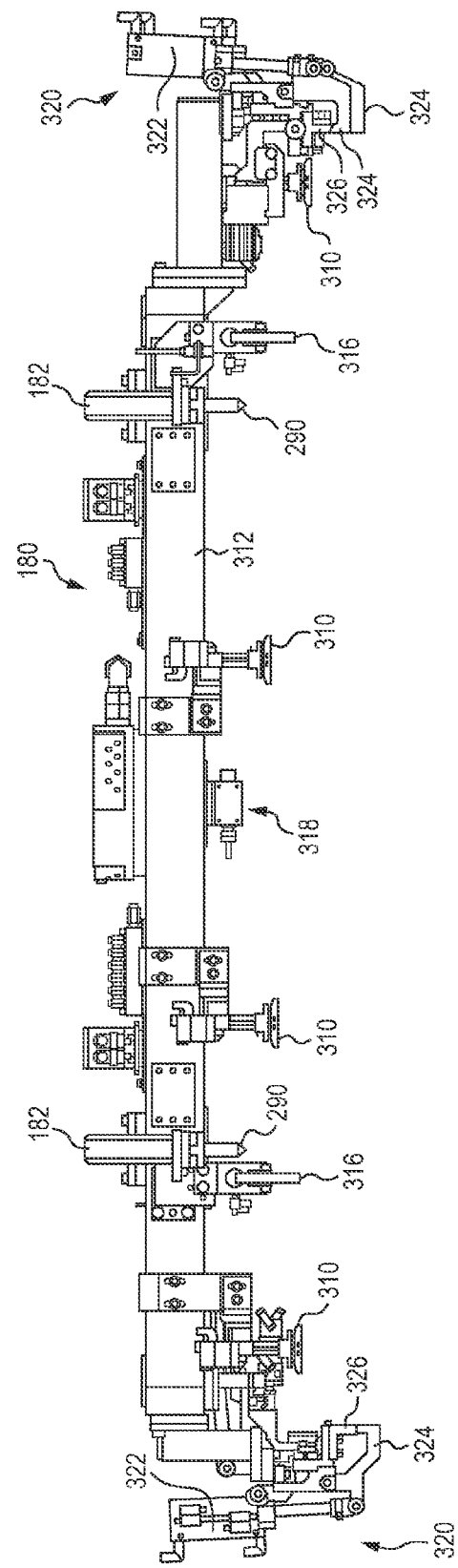
FIG. 14 is a side view of FIG. 12.

With reference to FIGS. 12 and 13, the second robot-guided handling device 180 further includes suction devices 310 connected to a main body 312 for releasably engaging the roof component 140. As depicted, each of the roof component jigs 182 are secured to the main body 312 and are oriented transverse to a longitudinal axis of the main body. Further connected to the main body 312 are a plurality of engagement fingers 316 which operably associated with the second alignment mechanism 184. The engagement fingers 316 are moveable relative to the base 312 and assist in the alignment of the roof component 140 on the roof component jigs 182. A secondary pusher or actuator 318 associated with the second alignment mechanism 184 is located beneath the main body 312 for aligning the roof component 140 on the roof component jigs 182 (see FIG. 14).

Figure 11E:
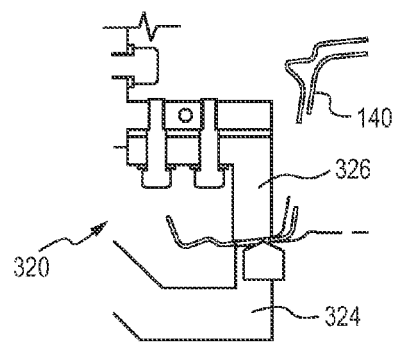
Figure 11C:
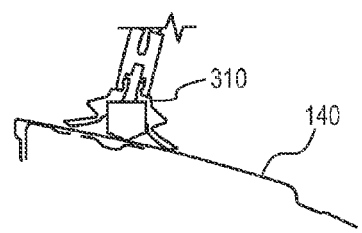

The second robot-guided handling device 180 further includes a plurality of clamp mechanisms 320 mounted to opposite end portions of the main body 312. In the depicted embodiment, each clamp mechanism 320 includes a piston 322 having a first finger 324 moveably mounted thereon. Actuation of the piston 322 causes the first finger 324 to move away from a stationary second finger 326. As shown in FIGS. 11D and 11E, the clamp mechanisms 320 clamp to front and rear portions of the roof component 140 after the vacuum is released from each of the suction devices 310 (see FIG. 11C).

Figure 16:
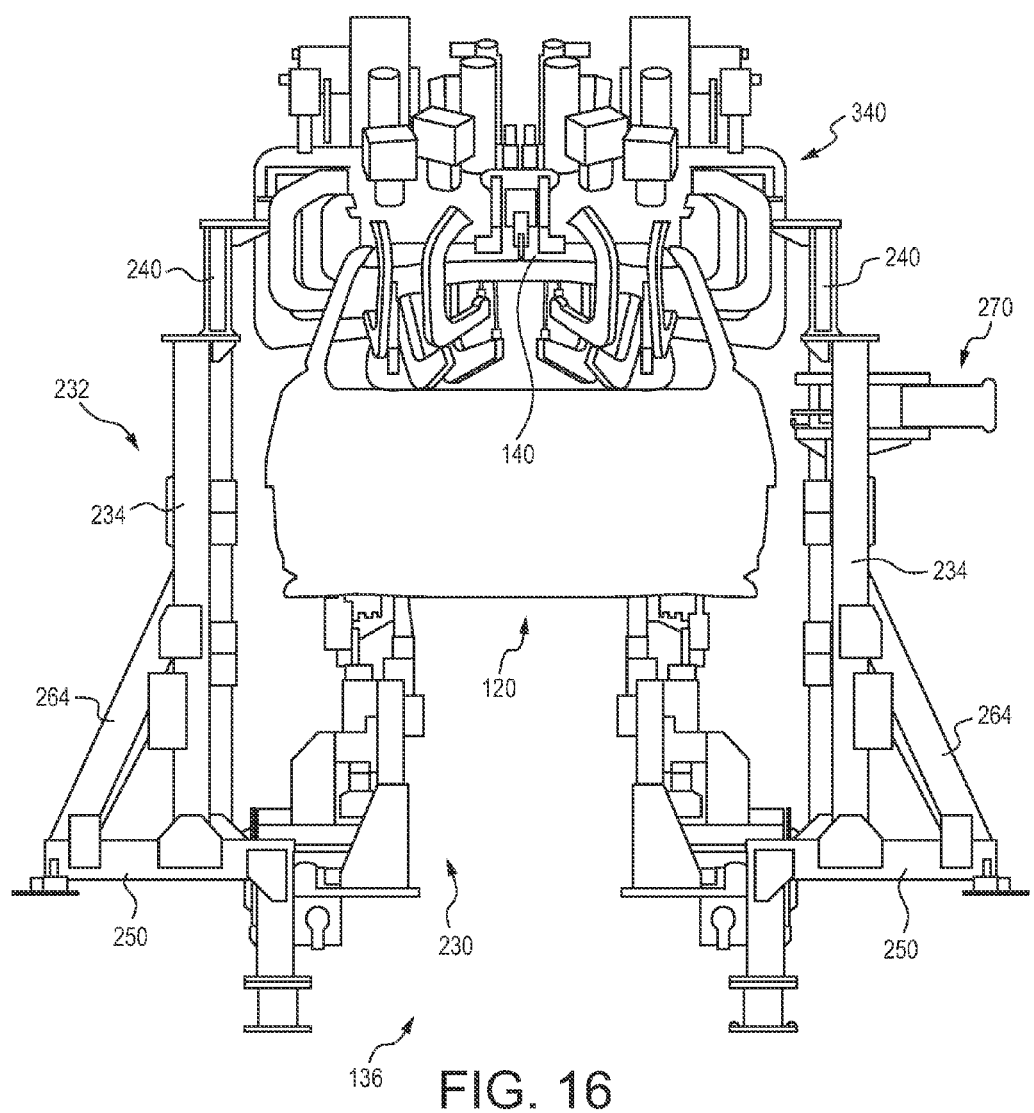
FIG. 16 is a view of a welder located in each of the welding stations of the second assembly line of FIG. 2 for securing the roof component to the vehicle body portion.

With reference again to FIG. 15, the second robot-guided handling device 180 sets the roof component jigs 182 together with the roof component 140 to the vertical support members 240 provided on the vertical frame members 234 of the second fixture 232 of the welding station 136. Once properly secured to the second fixture 232, the second robot-guided handling device 180 releases the vacuum for each of the suction devices 310 and actuates the pistons 322 of the clamp mechanisms 320 so that the roof component 140 is pinched between the engagement fingers 324 and the supports 326. At this time, as is shown in FIG. 16, a plurality of weld robots 340 enter the weld station 136 and weld the roof component 140 to the vehicle body portion 120 when the roof component is of the same material as the vehicle body portion 120 (i.e., the first material) or secures the roof component 140 to the vehicle body portion 120 via a plurality of fasteners (not shown) when the roof component 140 is formed of a material different than the material of the vehicle body portion (i.e., the second material). The vehicle body 122 is then transferred to the welding station 138 immediately downstream from the welding station 136. When the second component or roof component 140 is formed of the first material, the second assembly line 104 is configured to finish weld the second component 140 to the first components 120 of the vehicle body 122 in the welding station 138. When the second component or roof component 140 is formed of the second material, the second assembly line is configured to further fasten the second component to the first components of the vehicle body 122 in the welding station 138.

Accordingly, the second and third assembly lines 104, 106 are configured to facilitate vehicles having aluminum roof components secured to steel bodies via bolting and steel roof components secured to steel bodies (via welding). Benefits provided by the exemplary system 100 is the provision of additional process time to allow for an increase in spot welding capacity for improved body rigidity and the provision of a flexible solution for joining an aluminum roof component 140 to a steel vehicle body 122 outside the existing first assembly line 102.

As indicated previously, in operation, the roof component 140 will be auto-loaded into the cart 150 at the roof assembly line 106. The cart 150 will be transported and set into the cart lock station 152. The first robot-guided handling device 166 will pick up the roof component 140 from the cart and move the same to the roof component fixture 170. The roof component fixture 170 will position the roof component 140 using the first alignment mechanism 176. Once in position, the second robot-guided handling device 180 will align the roof component on the roof component jig 182 and move the roof component jig 182 with the roof component 140 secured therein to the welding station 136 for attaching the roof component to the vehicle body 122. Simultaneous with movement of the roof component 140 from the cart 150 to the roof component fixture 170, the vehicle body 122 is set to the body fixture 200 in the body station 132. If the roof component 140 is formed of the second material, the robot 220 applies adhesive to the roof opening 22 at the body station. At the welding station 136, the roof component 140 from the second robot-guided handling device 180 which is secured in the roof component jig 182 is set in position relative to the vehicle body 122, and particularly the second fixture 232. Advantageously, since the roof component 140 is precisely positioned on the roof component jig 182 and the vehicle body is precisely positioned relative to the second fixture 232, only the roof component jig 182 and second fixture 232 need be aligned for precisely positioning the roof component 140 on the vehicle body portion 120.

At the welding station 136, the roof component 140 is secured to the vehicle body portion 120. Again, if the roof component 140 is an aluminum component, the roof component is bolted to the vehicle body 122 by installing a plurality of bolts from an underside of the roof component 140 along the adhesive application areas. If the roof component 140 is a steel roof component, the roof component is welded to the vehicle body 122. After securing the roof component 140, the vehicle body portion 120 with the roof component 140 secured thereto can be advanced to the welding station 138 at which the bolts can be tightened for an aluminum roof component or the roof component can be re-spot welded if a steel roof component.

As is evident from the foregoing, the present disclosure provides an exemplary method of assembling a vehicle body 122 comprising assembling a body component 120 formed of steel or a steel-based alloy in a first assembly line 102; transferring the body component 120 to a separate second assembly line 104 for securing a roof component 140 to the body component 120; positioning the roof component 140 on a roof component jig 182; positioning the body component 120 on a body component fixture 230, 232; transferring the roof component jig 182 having the roof component 140 mounted thereon to a welding station 136 of the second assembly line 104; setting the roof component jig 182 in position relative to the body component fixture 230, 232 in the welding station; one of installing a plurality of bolts (not shown) between the body component 120 and roof component 140 in the welding station 136 and tightening the plurality of bolts when the roof component 140 is formed of aluminum or an aluminum-based alloy or welding the roof component 140 to the body component 120 when the roof component 140 is formed of a steel or steel-based alloy; transferring the body component 120 with the roof component 140 mounted thereon to a second welding station 138 of the second assembly line 104; and further tightening the plurality of bolts (not shown) when the roof component 140 is formed of aluminum or an aluminum-based alloy or finish welding the roof component 140 to the body component 120 when the roof component is formed of a steel or steel-based alloy.

The exemplary method of assembling the vehicle body 122 further comprises applying an adhesive to the body component 120 when the roof component 140 is formed of an aluminum or aluminum-based alloy prior to the setting the roof component jig 182; and clamping the roof component jig 182 to the body component 120 after the setting of the roof component jig 182 in position relative to the body component fixture 230, 232.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for assembling a vehicle body comprising:
a first assembly line having a plurality of first stations including at least one first welding station for welding first structural components that define a portion of a vehicle body, the first structural components are formed of a first material; and
a second assembly line separate from the first assembly line for receiving the portion of the vehicle body from the first assembly line, the second assembly line having a plurality of second stations including at least one second welding station, wherein the second welding station is adapted to secure a second structural component to the portion of the vehicle body; the second structural component being formed of one of the first material and a second material that is different from the first material;

wherein the second welding station includes a welding device and a fastening device capable of applying fasteners; wherein the second welding station is configured such that if the second component is made of the first material the second welding station welds the second component to the portion of the vehicle body using the welding device and wherein if the second component is made of the second material the second welding station fastens the second component to the portion of the vehicle body using the fastening device.

2. The system of claim 1, wherein the first material is a steel or steel-based alloy and the second material is an aluminum or aluminum-based alloy.

3. The system of claim 1, wherein the second assembly line is configured such that an adhesive is applied to the first structural components in a station located upstream of the second welding station when the second component is formed of the second material.

4. The system of claim 3, wherein the first structural components define a body component of the vehicle body and the second component is a roof component of the vehicle body.

5. The system of claim 4, further including a third assembly line separate from the first and second assembly lines, the third assembly line including a cart for receiving the roof component, wherein a cart lock station of the third assembly line is configured to receive the cart, and a first robot-guided handling device is configured to transport the roof component from the cart received in the cart lock station to a roof component fixture, wherein the roof component fixture includes an first alignment mechanism configured to move and align the roof component on the roof component fixture.

6. The system of claim 5, further including a second robot-guided handling device configured to move the roof component to the welding station of the second assembly line, the second robot-guided handling device is equipped with a roof component jig configured to have mounted thereto the roof component, and a second alignment mechanism operably associated with the roof component jig is configured to move and align the roof component on the roof component jig.

7. The system of claim 6, wherein the second alignment mechanism includes a first pusher for moving the roof component in a first direction on the roof component jig and a second pusher for moving the roof component in a second direction which is transverse to the first direction on the roof component jig.

8. The system of claim 6, wherein the second welding station of the second assembly line includes a first fixture adapted to have releasably mounted thereon the roof component jig.

9. The system of claim 8, wherein the roof component jig is releasably connected to the first fixture by at least one locating pin extending from the roof component jig and being received in an opening provided on the first fixture.

10. The system of claim 9, wherein the second assembly line includes a second fixture aligned with the first fixture and configured to support the body component, the second assembly line is configured to set the body component to the second fixture simultaneous with movement of the roof component to the roof component jig, and a third alignment mechanism operably associated with the second fixture is configured to move and align the body component on the second fixture.

11. The system of claim 3, wherein the second assembly line further includes a third welding station downstream from the second welding station, wherein when the second component is formed of the first material the second assembly line is configured to finish weld the second component to the first components in the third welding station, and when the second component is formed of the second material the second assembly line is configured to further fasten the second component to the first components in the third welding station.

12. A system for assembling a vehicle body comprising: a first assembly line having a plurality of first stations including at least one first welding station configured to assemble first structural components that define a body component of a vehicle body, the body component is formed of a steel or steel-based alloy;

a second assembly line separate from the first assembly line for receiving the body component from the first assembly line, the second assembly line including a plurality of second stations including at least one second welding station, the second assembly line adapted to secure a roof component to the body component; the roof component being formed of one of a steel or steel-based alloy and an aluminum or aluminum-based alloy, the second assembly line being configured such that the roof component is one of welded to the body component in the second welding station when the roof component is formed of a steel or steel-based alloy and fastened to the body component in the second welding station when the roof component is formed of an aluminum or aluminum-based alloy wherein the second welding station includes a welding device and a fastening device capable of applying fasteners; and a third assembly line separate from the first and second assembly lines, the third assembly line being configured to set the roof component on a roof component jig and transfer the roof component jig together with the roof component mounted thereon to the second welding station of the second assembly line for attaching the roof component to the body component.

13. The system of claim 12, wherein the plurality of stations of the second assembly line includes a body station located immediately upstream of the second welding station, and the second assembly line is configured such that adhesive is applied to the body component when the roof component is formed of an aluminum or aluminum-based alloy.

14. The system of claim 12, wherein an alignment mechanism operably associated with the roof component jig is configured to move and align the roof component on the roof component jig.

15. The system of claim 14, wherein a robot-guided handling device is configured to move the roof component jig together with the roof component aligned thereon to the second welding station of the second assembly line and set the roof component jig in a position relative to a fixture.

16. The system of claim 15, wherein the fixture is adapted to have releasably mounted thereon the roof component jig.

17. The system of claim 15, wherein the roof component jig is configured to engage the body component after being set in the position relative to the fixture.

18. The system of claim 17, wherein after securing the roof component to the body component in the second welding station, the second assembly line is configured to advance the body component with the roof component secured thereto to a third welding station downstream from the second welding station, wherein when the second component is formed of a steel or steel-based alloy the second assembly line is configured to finish weld the roof component to the body component in the third welding station, and when the second component is formed of an aluminum or aluminum-based alloy the second assembly line is configured to further fasten the roof component to the body components in the third welding station.

19. A method of assembling a vehicle body comprising:
assembling a body component formed of steel or a steel-based alloy in a first assembly line;
transferring the body component to a separate second assembly line for securing a roof component to the body component;
positioning the roof component on a roof component jig;
positioning the body component on a body component fixture;
transferring the roof component jig having the roof component mounted thereon to a first welding station of the second assembly line;
setting the roof component jig in position relative to the body component fixture in the welding station;
one of installing a plurality of bolts between the body component and roof component in the welding station and tightening the plurality of bolts when the roof component is formed of aluminum or an aluminum-based alloy or welding the roof component to the body component when the roof component is formed of a steel or steel-based alloy;
wherein the first welding station includes a welding device and a fastening device capable of applying fasteners;
transferring the body component with the roof component mounted thereon to a second welding station of the second assembly line; and further tightening the plurality of bolts in the second welding station when the roof component is formed of aluminum or an aluminum-based alloy or finish welding the roof component to the body component when the roof component is formed of a steel or steel-based alloy.

20. The method of claim 19, further comprising applying an adhesive to the body component when the roof component is formed of an aluminum or aluminum-based alloy prior to the setting the roof component jig; and clamping the roof component jig to the body component after the setting of the roof component jig in a position relative to the body component fixture.

* * * * *